April 20, 1965  D. J. ASHCROFT  3,179,243
SHIELDED CONTAINERS FOR NUCLEAR FUEL ELEMENTS
Filed May 15, 1961  3 Sheets-Sheet 3
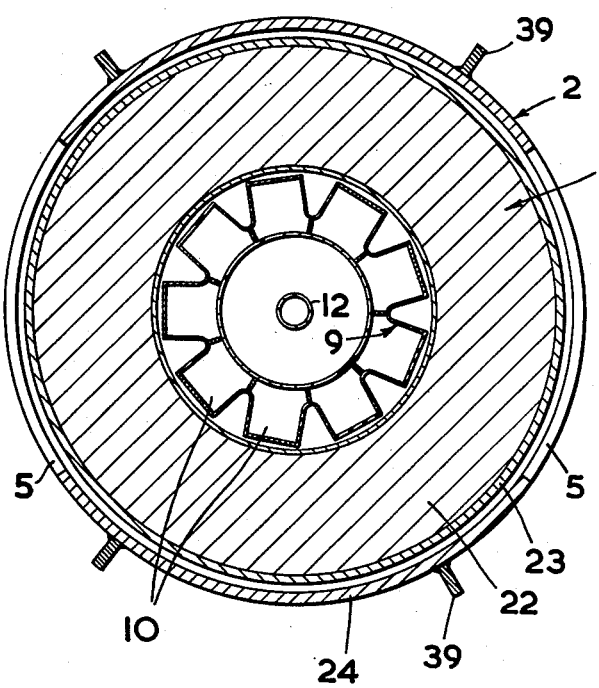
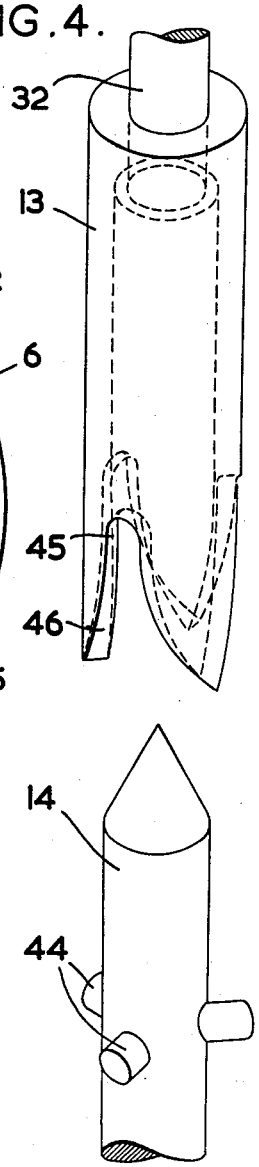

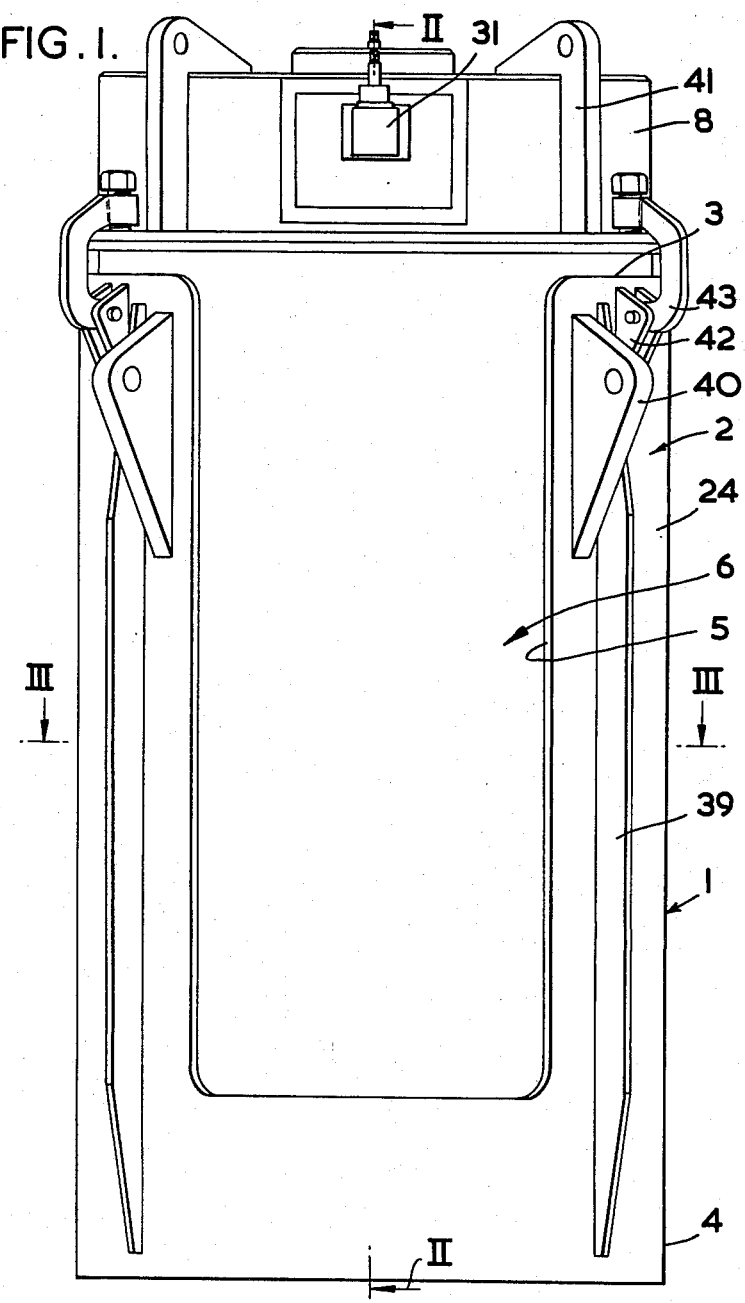

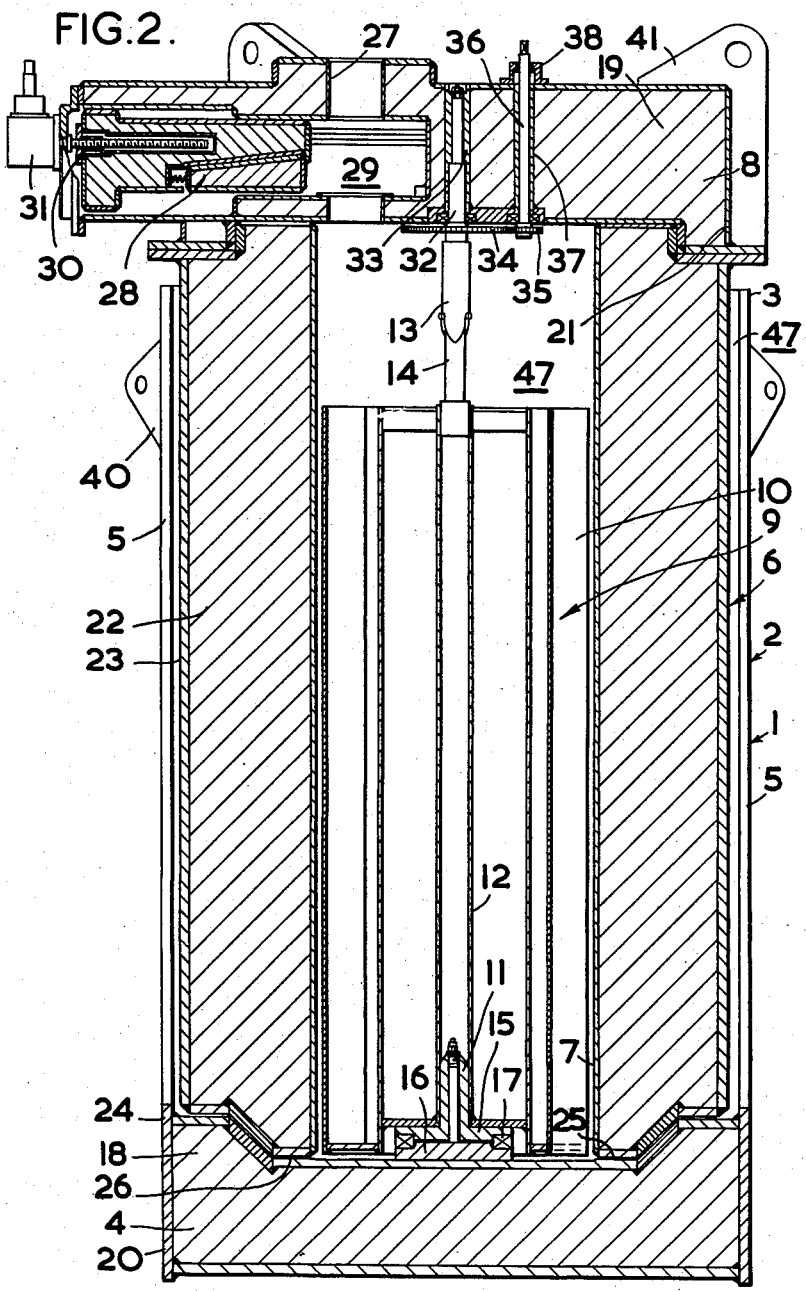

3,179,243
SHIELDED CONTAINERS FOR NUCLEAR
FUEL ELEMENTS
David John Ashcroft, Horwich, England, assignor to
United Kingdom Atomic Energy Authority, London,
England
Filed May 15, 1961, Ser. No. 110,137
Claims priority, application Great Britain, May 24, 1960,
18,367/60
4 Claims. (Cl. 206—1)

This invention relates to shielded containers for the temporary storage of nuclear fuel elements which have become irradiated through service in a nuclear reactor.

Such containers are used to transfer the irradiated fuel elements to a "cooling pond" (usually close to the reactor site) where the fuel elements can remain under water until their activity falls to a level tolerable in a fuel element processing plant.

One known form of container comprises a pot-like vessel of shielding material having an upper end closed by a close fitting cover of similar material. Upon arrival at the cooling pond the container is lowered to the bottom of the pond, where, under the shielding protection offered by the pond water, the container cover is removed, the fuel elements withdrawn vertically from the container and deposited upon the pond bottom and the empty container then lifted out of the pond for further use.

This form of container, although suitable for use in transferring irradiated fuel elements to cooling ponds of substantial depth is unsuitable for use with fuel elements removed from ship-borne reactors wherein the cooling "pond" takes the form of a water filled tank within the hull of a barge disposed alongside the ship.

The depth of water in the tank of the barge, compared with that available in a land based cooling pond, may be relatively small and it therefore becomes an object of the invention to provide a container suitable for use in such conditions.

According to the invention, a shielded container for the temporary storage of irradiated fuel elements comprises two mating parts of tubular form, the first having a closed lower end and an upper open end and the second having an open lower end and a closed upper end, a fuel supporting magazine demountably located in said first part, means defining an opening in the wall of said first part of a size and form allowing sideways removal of said mazagine and means defining a port in the closed end of said second part in line with said magazine for the endwise entry of fuel into said magazine.

An embodiment of the invention will now be described by way of example with reference to the accompanying drawings wherein:

FIGURE 1 is a side view,
FIGURE 2 is a sectional view taken on the lines II—II of FIGURE 1,
FIGURE 3 is a sectional view taken on the lines III—III of FIGURE 1, and
FIGURE 4 is an enlarged detail.

Referring to FIGURES 1, 2 and 3, a shielded container 1 for the temporary storage of irradiated fuel elements comprises a first upright tubular part 2 having an open upper end 3 in a closed lower end 4, oppositely disposed access ports 5 of a size allowing side removal of a demountable fuel element supporting magazine 9 and a second upright tubular part 6 having an open lower end 7 and a closable upper end 8, the part 6 mating with the part 2. A fuel element inserting port 27 is provided in the end 8.

The fuel element magazine 9 is of cylindrical form having nine equi-spaced longitudinal compartments 10, each of which provides accommodation for a single nuclear fuel element. The magazine 9 is rotatable about its axis, the lower end of the magazine being supported by a spindle 11 extending from the end 4 of the part 2 and located with clearance in the lower end of a tube 12 disposed along the axis. The upper end of the magazine 9 is supported by a coupling sleeve 13 extending from the end 8 of the part 6 so as to embrace a spindle 14 secured in the upper end of the tube 12. The spindle 11 has a base 15 spaced from a pad 16 by a bearing ring 17.

Top and bottom shielding of the container 1 is provided by the ends 4, 8 of the parts 2, 6 and the side shielding by the walls of the part 6. The ends 4, 8 are formed by lead slabs 18, 19 enclosed in mild steel casings 20, 21. The walls of the part 6 are formed by a hollow cylinder 22 of lead enclosed in a mild steel casing 23. The walls of the part 2 are formed by steel plates 24.

The part 6 is suppported by the part 2, the rim 25 of the lower end 7 of the part 6 being spaced from the upper face of the end 4 of the part 2 by a rubber joint ring 26. The joint 26 retains water in a chamber 47 defined by the inner wall of the cylinder 22. The water provides a coolant for fuel element present in the magazine 9. Adjacent faces of the rim 25 and end 4 are stepped so as to provide a radiation trap.

A shielded valve 28 is movable in a recess 29 to close-off the port 27 when necessary, the valve being operated by rotation of a valve spindle 30 by a spindle drive mechanism 31. The coupling sleeve 13 is attached to the lower end of a shaft 32 rotatable in a sleeve bearing 33 located in the end 8 of the part 6. A large diameter toothed wheel 34 mounted on the shaft 32 engages with a small diameter toothed wheel 35 mounted on a shaft 36 rotatable in a sleeve bearing 37 also located in the end 8. The upper end of the shaft 36 extends through the end 8 and is sealed thereto by a gland 38. The wheel 34 has nine times as many teeth as the wheel 35 so that a complete rotation of the shaft 36 results in one-ninth of a rotation of the shaft 32 and hence, through the coupling sleeve 13, the magazine 9. Rotation of the shaft 36 therefore results in the magazine compartments 10 being disposed in turn beneath the port 27, each complete rotation of the shaft 36 resulting in a different compartment 10 being brought into register with the port 27.

The plates 24 of the part 2 are strengthened by longitudinal ribs 39 and lifting lugs 40 are welded to the plates. The end 8 of the part 6 has lifting lugs 41. Brackets 42 on the end 3 of the part 2 support pivotally mounted clamps 43 which clamp the parts 2 and 6 together.

The upper end of the spindle 14 (see FIGURE 4) carries three radially projecting locating pins 44 and the lower end of the coupling sleeve 13 has three longitudinal slots 45 for engagement with the pins 44. The slots 45 have flared sides 46 to assist location of the pins 44.

Consider the containment 1 assembled as shown in FIGURES 1, 2 and 3 within a closed reactor compartment of a shipborne reactor, the compartments 10 of the fuel element magazine 9 being empty of fuel elements and the shielded valve 28 open. A fuel element refuelling machine is used to withdraw irradiated fuel elements from the reactor and the refuelling machine then positioned over the inserting port 27 and the irradiated fuel elements fed into the magazine 9 one at a time with rotation of the magazine by the shaft 36 after each fuel element is inserted. When the magazine 9 is full, the valve 8 is closed and the refuelling machine removed. A crane is then used to withdraw the container 1 out of the reactor compartment of the ship through an air lock and to lower the container into a water filled tank in the hull of a barge alongside the ship. The lifting lugs 40 attached to the part 2 are used for this purpose. When the level of water in the barge tank is adjacent the lugs 40, lowering of the container 1 is halted and the clamps 43 are released. Lowering of the container 1 is then continued until the container is supported by the tank bottom. Using remote handling equipment, the crane is uncoupled from the lugs 40 and then coupled to the lugs 41 on the end 8 of the part 6. The crane is then used to withdraw the part 6 from within the part 2, leaving the magazine 9 behind. A grab is then used to grip the upper end of the spindle 14 of the magazine 9 and to lift the magazine clear of the spindle 11 locating its lower end, the magazine is then withdrawn sideways through one of the ports 5 and deposited upon the bottom of the tank. The lugs 40 are then re-coupled to the crane and the part 2 withdrawn from the tank. The magazine 9 is replaced by a further magazine and the container 1 reassembled by inserting the part 6 into the part 2. The clamps 43 are re-secured in position and the container 1 is then filled with water and is ready for further use.

It is seen that the fuel is handled with a high degree of safety. It is removed from a closed reactor compartment into the open air through an air lock. Whilst it is being moved in the open air it is sealed in the container so that it is not exposed to the atmosphere or is never in a position that it can shed any radioactive contamination. The container can be opened and emptied under water where the depth of water does not greatly exceed the depth of the container.

I claim:

1. A shielded container for the temporary storage of irradiated fuel elements, comprising first and second upright parts of tubular form, the second part being insertable lengthwise into the first part, the first part having a closed lower end and an open upper end and the second part having an open lower end and a closed upper end, a fuel magazine disposed within said first part, support means locating said magazine within said first part, said first part defining an opening in the side wall thereof of a size and form allowing side ways removal of said magazine from said first part, said opening normally being closed by the side wall of the second part when said second part is inserted into said first part, said closed end of said second part defining a port aligned with said magazine for the endwise entry of fuel into said magazine.

2. A shielded container for the temporary storage of irradiated fuel elements, comprising first and second upright parts of tubular form, the second part being insertable lengthwise into the first part, the first part having a closed lower end and an open upper end and the second part having an open lower end and a closed upper end, a fuel magazine disposed within said first part, support means locating said magazine within said first part, said first part defining an opening in the side wall thereof of a size and form allowing sideways removal of said magazine from said first part, said opening normally being closed by the side wall of the second part when said second part is inserted into said first part, said closed end of said second part defining a port aligned with said magazine for the endwise entry of fuel into said magazine, and a sealing joint member between the lower end face of the wall of said second part and the closed lower end of said first part.

3. A shielded container for the temporary storage of irradiated fuel elements, comprising first and second upright parts of tubular form, the second part being insertable lengthwise into the first part, the first part having a closed lower end and an open upper end and the second part having an open lower end and a closed upper end, a fuel magazine disposed within said first part, support means locating said magazine within said first part, said first part defining a longitudinal opening in the side wall thereof extending lengthwise downwards from the upper end face of said first part, said opening being of size allowing side removal of said magazine from said first part, said opening normally being closed by the side wall of the second part when said second part is inserted into said first part; said closed end of said second part defining a part aligned with said magazine for the endwise entry of fuel into said magazine.

4. A shielded container for the temporary storage of irradiated fuel elements, comprising first and second upright parts of tubular form, the second part being insertable lengthwise into the first part, the first part having a closed lower end and an open upper end and the second part having an open lower end and a closed upper end, a fuel magazine disposed within said first part, support means locating said magazine within said first part, said first part defining a longitudinal opening in the side wall thereof extending lengthwise downwards from the upper end face of said first part, said opening being of size and form allowing sideways removal of said magazine from said first part, said opening normally being closed by the side wall of the second part when said second part is inserted into said first part, said closed end of said second part defining a port aligned with said magazine for the endwise entry of fuel into said magazine, and a sealing joint member between the lower end face of the wall of said second part and the closed lower end of said first part.

References Cited by the Examiner
UNITED STATES PATENTS

| 2,853,625 | 9/58 | Ohlinger | 250—108 |
| 2,855,114 | 10/58 | Ohlinger | 250—106 |
| 2,875,345 | 2/59 | Nicoll | 250—108 |

RALPH G. NILSON, *Primary Examiner.*

ARTHUR GAUSS, *Examiner.*